United States Patent [19]

Hendriks

[11] Patent Number: 4,830,581

[45] Date of Patent: May 16, 1989

[54] APPARATUS FOR DISPENSING MEASURED QUANTITIES OF A LIQUID MATERIAL

[75] Inventor: Albertus G. Hendriks, Vlaardingen, Netherlands

[73] Assignee: Lever Brothers Company, New York, N.Y.

[21] Appl. No.: 65,812

[22] Filed: Jun. 23, 1987

[30] Foreign Application Priority Data

Jun. 25, 1986 [NL] Netherlands ............... 8601659

[51] Int. Cl.$^4$ .................................. F04B 23/04
[52] U.S. Cl. ........................... 417/252; 137/115; 137/566; 200/83 R
[58] Field of Search .............. 137/115, 566, 569, 116; 251/129.04; 200/83 R, 83 N; 417/287, 252

[56] References Cited

U.S. PATENT DOCUMENTS

| | | | |
|---|---|---|---|
| 3,015,417 | 1/1962 | Daley | 137/569 X |
| 3,304,386 | 2/1967 | Shlesinger | 200/83 N |
| 3,515,164 | 6/1970 | Dunnous | 137/566 X |
| 3,939,383 | 2/1976 | Alm | 200/83 R X |
| 4,505,647 | 3/1985 | Alloca et al. | 417/252 |

FOREIGN PATENT DOCUMENTS 403970  5/1943  Italy .................................. 137/569

Primary Examiner—Stephen Hepperle
Attorney, Agent, or Firm—Milton L. Honig

[57] ABSTRACT

The invention concerns an apparatus for dispensing measured quantities of a liquid or liquefied material, comprising first pumping means, capable of delivering a continuous flow of material, second pumping downstream from said first pumping means, said second pumping means being capable of delivering less than the amount fed thereto by said first pumping means, a recirculation line, connected to the line connecting said first and said second pumping means, said recirculation line being provided with a valve and means for compensating excess of material fed by said first pumping means, which means for compensating excess material are present in said connecting line, and can activate a switch for opening said valve. In order to obviate possible problems concerning contamination by microorganisms, and to provide longer production runs, the invention is characterized in that said means for compensating excess material comprises a membrane which is impermeable for said liquid or liquefield material.

7 Claims, 1 Drawing Sheet

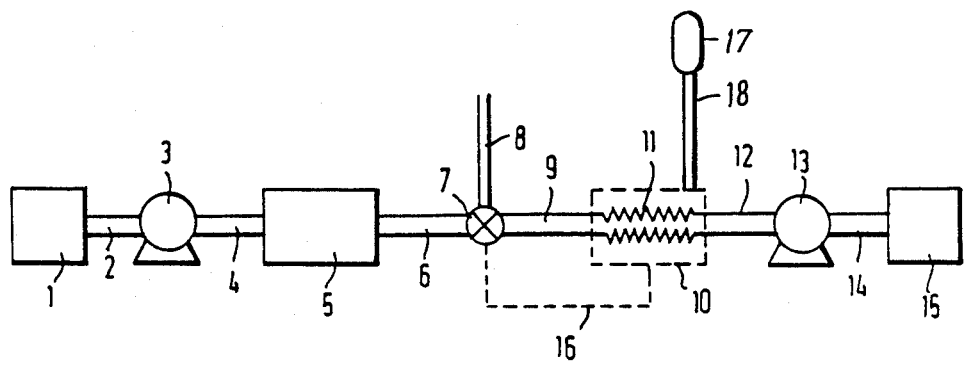

APPARATUS FOR DISPENSING MEASURED QUANTITIES OF A LIQUID MATERIAL

FIELD OF THE INVENTION

The invention is directed to an apparatus for dispensing measured quantities of a liquid or liquefied material, comprising first pumping means, capable of delivering a continuous flow of material, second pumping means downstream from said first pumping means, said second pumping means being capable of delivering less than the amount fed thereto by said first pumping means, a recirculation line, connected to the line connecting said first and said second pumping means, said recirculation line being provided with a valve, and means for compensating excess of material fed by said first pumping means, which means for compensating excess material are present in said connecting line, and can activate a switch for opening said valve.

BACKGROUND OF THE INVENTION

In processing food products on an industrial scale, as in the production of margarine and other liquid or liquefiable edible products processed in the liquid state, it is important that the equipment should be, and remain, as clean as possible, more particularly that the presence of microorganisms in the equipment should be avoided as much as possible. As also disclosed in HLM Lelieveld, Hygienic Design and Test Methods, Journal of the Society of Dairy Technology, Vol. 38, No. 1, January 1985, pages 14-16, a distinction is to be made between "hygienic processing" and "aseptic processing". Hygienic processing means in this connection that the increase in the concentration of microorganisms during processing is relatively small owing to the equipment, while during aseptic processing no increase in the concentration of micro-organisms in the product may occur owing to the equipment. It is important both for hygienic and aseptic processing that the equipment employed should be sterilizable and for aseptic equipment also that it should be bacteria tight.

In the processing of liquefied materials, which optionally contain solid constituents, usually first pumping means are present, which transport continuously the product through the processing unit. In the case of consumer products, such as margarine, soups, mayonnaise, etc. these products are usually fed to second pumping means, shortly before a metering device, which second pumping means acts continuously, semi-continuously or discontinuously, but anyway at a lower throughput than said first pumping means. One of the reasons therefor is that the metering device and the packing machine should never be short of product. However this means that the excess of products flowing to the second pumping means should be compensated for. This is usually done by providing a recirculation line, which can be shut off by means of a valve or other means for closing the recirculation line.

Furthermore in the vicinity of the recirculation line a compensating piston is provided for, which piston allows excess material into the piston chamber. Once the piston has reached its outward position, it activates a switch which in turn opens the valve in the recirculation line. The excess material present in the piston chamber is then removed, and when the piston reaches its inward position, the recirculation line is closed again.

With this system it is however very difficult to maintain hygienic or aseptic conditions as set forth hereinbefore, as it is notoriously difficult to make pistons bacteria-tight.

SUMMARY OF THE INVENTION

The present invention now provides for an apparatus as set forth hereinbefore, which is suitable for hygienic and aseptic processing of liquid or liquefied materials, and is characterized in that said means for compensating excess material comprises a membrane which is impermeable for said liquid or liquefied material.

The membrane, which surprisingly can be used very easily as compensation means, has to be impermeable for said liquid or liquefied material. Furthermore the membrane is preferably sterilizable.

According to one embodiment of the present invention the membrane is in tubular form, which means that the liquid or liquefied material can pass through the inside of the tubular membrane, causing expansion of the tube when an excess of material accumulates.

According to another, though less preferred embodiment, a flat membrane is used, which membrane can be present alongside of the line connecting said first and said second pumping means. This embodiment is less preferred, as the presence of a flat membrane can give rise to dead areas, where there is no or little flow of material. This could give rise to accumulation of material having a very long residence time in the apparatus, which is less preferred from microbiological point of view.

Preferably the apparatus is provided with means for applying a pressure on the outside of the membrane, which pressure will approximately be equal to the line pressure at the point of the compensating means, so that the membrane can expand when excess material accumulates. The counterpressure is usually applied by a gas or a liquid. However, a liquid is preferred as this is less compressible, thus making it possible to use the amount of displaced liquid for activating the switch opening the valve.

According to another embodiment the valve is opened by a switch activated by contact of the membrane with the switch.

It is of course possible to use all kinds of known switches or sensors for activating the opening of the valve. This can be done mechanically, electronically, but also by determining the amount of displaced pressurizing liquid, or pressure in the liquid or gas outside the membrane.

The membrane can be prepared from all materials, which are known to be suitable for contact with liquid or liquefied materials, and which are impermeable for said material. Furthermore the membrane material should be able to withstand sterilization.

With the apparatus of the present invention it is possible to make much longer production runs without closing down for cleaning and sterilizing the apparatus. In prior art devices using pistons as compensating means, sometimes production runs as short as only four hours could be used. Consequently the present apparatus provides a clear advantage in that much less and shorter down times are needed. This makes it possible to increase the throughput of the whole of the production line.

BRIEF DESCRIPTION OF THE DRAWINGS

The present invention is now elucidated on the basis of the figure, in which figure a flow sheet is given of a production line incorporating the present invention.

DETAILED DESCRIPTION OF THE INVENTION

In the figure, a liquid or liquefied material, for example margarine, is produced in unit 1, which material flows from this unit along line 2 to first pumping means 3. Said first pumping means 3 feeds the material through line 4, to unit 5, wherein for example further cooling or working takes place. The presence of unit 5 is not compulsory as it is, for example, possible that pumping means 3 directly feed the product to line 6.

From unit 5, the product flows through line 6 to connection 7, which connection also comprises means for closing the flow to recirculation line 8. From connection 7, the product flows through line 9, to compensating unit 10, which compensating unit 10 is provided with a tubular membrane 11. From the compensating unit 10 the product flows through line 12 to second pumping means 13, which pumping means feed the material through line 14 to packing machine 15.

During operation connection 7 is first in a position that all product flows from line 6 through line 9 to compensating means 11. Due to the lower throughput of pumping means 13 than pumping means 3, material accumulates upflow from second pumping means 13, causing the membrane 11 to expand. As soon as said membrane reaches its outer position, in which position a switch or sensor is activated, a signal goes from said switch or sensor through 16 to connection 7. This causes the valve into the recirculation line to be opened, so that the excess of material flows through recirculation line 8 to rework facilities (not shown in the production line). As soon as the membrane reaches its original, inner position, which can be done either by the forces exerted by the membrane itself, or by external pressure, the flow through the recirculation line is closed, and the process repeats itself again. Under circumstances where external pressure is utilized, a pressure reservoir 17 containing either a working liquid or gas is connected by piping 18 to compensating unit 10. The working gas or liquid exerts a countervailing pressure against tubular membrane 11 assuring that the membrane wall returns to its original inner position.

It is of course clear that various modifications can be made to this invention without departing from the spirit thereof. For example it is possible that production facilities 1 are not present, so that said first pumping means are in fact the start of the process. Furthermore it is also possible that the recirculation line 8 is not completely closed, but there is always a small flow through said line, so that when the membrane reaches its outer position and activates the switch, only the flow through the recirculation line is increased, and once the membrane has reached its original position, the valve is not completely closed, but returns to its original position, allowing a smaller throughput.

I claim:

1. Apparatus for dispensing measured quantities of an edible liquid or liquefied material, comprising first pumping means, capable of delivering a continuous flow of material, second pumping means downstream from said first pumping means, said second pumping means being capable of delivering less than the amount fed thereto by said first pumping means, a recirculation line connected to a line connecting said first and said second pumping means, said recirculation line being provided with a valve and means for compensating excess of material fed by said first pumping means, which means for compensating excess material are present in said connecting line, and can activate a switch for opening said valve, characterized in that said means for compensating excess material comprises a tubular membrane which is impermeable for and in direct contact with said liquid or liquefied material and wherein said material can pass through the inside of said tubular membrane, said membrane activating a switch which activates said valve.

2. Apparatus according to claim 1, characterized in that a substantially flat membrane is used.

3. Apparatus for dispensing measured quantities of a liquid or liquefied material comprising:
   first pumping means capable of delivering a continuous flow of material;
   second pumping means downstream from said first pumping means, said second pumping means being capable of delivering less than the amount fed thereto by said first pumping means;
   a line connecting said first and said second pumping means;
   a unit for cooling or working said liquid or liquefied material which is an edible product; said unit positioned in said connecting line between said first and said second pumping means;
   a recirculation line connected to said line connecting said first and said second pumping means;
   a valve provided in said recirculation line;
   means for compensating excess of material fed by said first pumping means, which means for compensating excess material is present in said connecting line, and can activate a switch for opening said valve, said means for compensating excess material comprising a tubular membrane which is impermeable to and directly in contact with said liquid or liquefiable material, and wherein said material can pass through the inside of said tubular membrane.

4. Apparatus according to claim 3, wherein said edible product is selected from the group consisting of margarine, soups and mayonnaise.

5. Apparatus for dispensing measured quantities of an edible liquid or liquefied material, comprising first pumping means, capable of delivering a continuous flow of material, second pumping means downstream from said first pumping means, said second pumping means being capable of delivering less than the amount fed thereto by said first pumping means, a recirculation line connected to a line connecting said first and said second pumping means, said recirculation line being provided with a valve and means for compensating excess of material fed by said first pumping means, which means for compensating excess material are present in said connecting line, and can activate a switch for opening said valve, characterized in that said means for compensating excess material comprises a membrane which is impermeable for and in direct contact with said liquid or liquefied material, said membrane activating a switch which activates said valve, and wherein a pressure by means of a pressurizing liquid or gas can be applied to that side of the membrane that does not come into contact with the liquid or liquefied material.

6. Apparatus for dispensing measured quantities of a liquid or liquefied material comprising:

first pumping means capable of delivering a continuous flow of material;

second pumping means downstream from said first pumping means, said second pumping means being capable of delivering less than the amount fed thereto by said first pumping means;

a line connecting said first and said second pumping means;

a unit for cooling or working said liquid or liquefied material which is an edible product; said unit positioned in said connecting line between said first and said second pumping means;

a recirculation line connected to said line connecting said first and said second pumping means;

a valve provided in said recirculation line;

means for compensating excess of material fed by said first pumping means, which means for compensating excess material is present in said connecting line, and can activate a switch for opening said valve, said means for compensating excess material comprising a membrane which is impermeable to and directly in contact with said liquid or liquefiable material, and wherein a pressure by means of a pressurizing liquid or gas can be applied to that side of the membrane that does not come into contact with the liquid or liquefied material.

7. Apparatus according to claim 6, wherein said edible product is selected from the group consisting of margarine, soups and mayonnaise.

* * * * *